United States Patent Office 3,755,399
Patented Aug. 28, 1973

3,755,399
**METHOD FOR PREPARING ORGANOPOLYSILOX-
ANE-POLYOXYALKYLENE BLOCK COPOLYMERS**
Siegfried Nitzsche, Ewald Pirson, and Peter Huber,
Burghausen, Germany, assignors to Wacker Chemie
GmbH, Munich, Germany
No Drawing. Filed Sept. 13, 1971, Ser. No. 180,155
Claims priority, application Germany, Sept. 14, 1970,
P 20 45 360.5
Int. Cl. C07f 7/18
U.S. Cl. 260—448.8 R    23 Claims

ABSTRACT OF THE DISCLOSURE

A method for preparing organopolysiloxane-polyoxyalkylene block copolymers in which the polyoxyalkylene blocks are bonded to the organopolysiloxane blocks by an Si—O— bond, which comprises reacting in a first stage an organopolysiloxane having silicon-bonded hydroxyl groups with the chlorine atom or atoms of a polyoxyalkylene compound and thereafter reacting the silicon-bonded hydrogen atoms of the reaction product thus formed with the unreacted silicon-bonded hydroxyl groups from the first stage. The block copolymer thus formed are useful as additives to paints, foam stabilizers for polyurethane foams, emulsifiers, lubricants and the like.

---

This invention relates to a method for preparing organopolysiloxane-polyoxyalkylene block copolymers and more particularly to an improved method for preparing copolymers in which the polyoxyalkylene blocks are bonded to the organopolysiloxane blocks by an Si—O—C bond.

Heretofore, organopolysiloxane-polyoxyalkylene copolymers have been prepared by dealcoholating organosiloxanes, containing alkoxy groups, and a hydroxylpolyoxyalkylene compound in the presence of an acid catalyst, particularly in the presence of trifluoroacetic acid (cf. U.S. Pat. 2,917,480 and U.S. Pat. 2,834,748).

Another method for preparing organopolysiloxane-polyoxyalkylene block copolymers has been described in U.S. Pat. 3,555,063. The block copolymers are prepared by reacting organohydrogen siloxane polymers containing hydrogen atoms directly bonded to silicon atoms, with chlorine so as to carry out dehydrochlorination, substituting chlorine atoms for hydrogen atoms directly bonded to silicon atoms, and reacting the resulting organosiloxane polymers, containing chlorine atoms directly bonded to silicon atoms, with hydroxylpolyoxyalkylene compounds in the presence of organic amines.

Various other methods for preparing organopolysiloxane-polyoxyalkylene block copolymers have been described in British patent specification 1,084,233. However, the various methods described heretofore, employ organosilicon compounds and organic compounds which contain a large number of silicon-bonded or carbon-bonded hydroxyl groups, whereas the present invention is predicated on the use of more readily available organosilicon compounds and/or products which are substantially free of or contain relatively few silicon-bonded or carbon-bonded hydroxyl groups.

Therefore, it is an object of this invention to provide a method for preparing organopolysiloxane-polyoxysiloxane block copolymers.

Another object of this invention is to provide a method for preparing organopolysiloxane-polyoxysiloxane block copolymers from readily available organosilicon compounds.

Still another object of this invention is to provide a method for preparing organopolysiloxane-polyoxyalkylene block copolymers from readily available organosilicon compounds which contain relatively few silicon-bonded or carbon-bonded hydroxyl groups.

A further object of this invention is to provide a method for preparing organopolysiloxane-polyoxyalkylene block copolymers from organopolysiloxanes having silicon-bonded hydroxyl groups and polyoxyalkylene glycols or polyoxyalkylene glycol monoethers.

The foregoing objects and others which will become apparent from the following description are accomplished in accordance with this invention, generally speaking, by reacting in a first stage organopolysiloxanes containing silicon-bonded hydroxyl groups with the chlorine atom or chlorine atoms on polyoxyalkylene compounds having at least one group of the general formula:

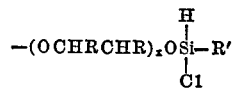

wherein each R, which may be the same or different represents hydrogen or an alkyl group, R' represents a hydrocarbon group having from 1 to 6 carbon atoms, for example, alkyl radicals such as methyl, ethyl, propyl, butyl, hexyl and aryl radicals such as phenyl, and $x$ denotes a number of from 4 to 50, and thereafter reacting in a second stage, the silicon-bonded hydrogen atoms of the reaction product thus formed with the unreacted silicon-bonded hydroxyl groups from the first stage to form organopolysiloxane-polyoxyalkylene block copolymers. The silicon atoms of the block copolymers thus formed each have a polyoxyalkylene block bonded thereto and the residual valences are satisfied by an alkyl radical and two siloxane oxygen atoms.

In accordance with this invention, it is possible to use organopolysiloxanes having silicon-bonded hydroxyl groups in the first stage in the preparation of organopolysiloxane-polyoxyalkylene block copolymers by reacting these organopolysiloxanes with polyoxyalkylene glycols or polyoxyalkylene glycol monoethers. These organopolysiloxanes may be represented by the general formula:

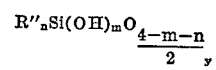

in which R" represents the same or different monovalent substituted and unsubstituted hydrocarbon radicals having from 1 to 6 carbon atoms, $n$ and $m$ each represent a number of from 0 to 3, the sum of $m$ and $n$ is not greater than 3 with the average value of $m$ being 0.005 to 0.4 and the average value of $n$ being 0.8 to 2.2, and $y$ is a number of from 5 to 3,000. Preferably, the average value of $m$ is 0.1 to 0.3.

Examples of hydrocarbon radicals represented by R" are, alkyl and cycloalkyl radicals, such as methyl, ethyl, n-propyl, isopropyl, n-butyl, n-hexyl and cyclohexyl radicals, aryl radicals such as phenyl and the like. Examples of substituted hydrocarbon radicals are halogenated hydrocarbon radicals, such as the perfluorovinyl radical. Because of easy accessibility, it is preferred that at least 90% of the radicals represented by R" be methyl radicals.

The organopolysiloxanes possessing silicon-bonded hydroxyl groups, which can be used in accordance with this invention are well known. These organopolysiloxanes may be conventionally prepared by hydrolyzing chlorosilanes of the general formula $R''_nSiCl_{4-n}$, where R" and $n$ are the same as defined above, in the presence of inert solvents. The hydrolysis is appropriately carried out by adding the chlorosilane or a mixture of such chlorosilanes to a mixture of water and solvent with agitation, separating the organic layer from the aqueous layer and thereafter washing the organic layer with water until it is free of acid. The organic layer may be separated from the water contained therein, for example by contacting it with anhydrous sodium sulphate or by azeotropic distillation. The organopolysiloxane solution thus obtained may be used without further purification in the preparation of the organopolysiloxane-polyoxyalkylene copolymers of this invention. In addition, the same equipment in which the hydrolysis and purification of the organopolysiloxane solution has been conducted may be used in the preparation of the block copolymers.

Examples of solvents which may be used in both the hydrolysis and in the preparation of the copolymers of the invention are hydrocarbons which are liquid at room temperature and 760 mm. Hg (absolute), such as petroleum ether, benzene, toluene and xylenes; as well as ethers, such as n-butyl ether, diethyl ether and ethylene glycol dimethyl ether and ketones, such as acetone and dibutyl ketone.

The polyoxyalkylene compounds used in this invention have at least one group of the general formula

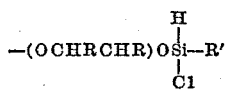

and are represented by the general formula

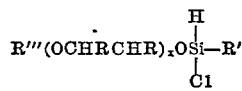

wherein R, R' and x are the same as defined above and R''' is a mono-valent hydrocarbon radical free from aliphatic unsaturation and may be interrupted by ether oxygen atoms. In addition R''' may be an acyl radical or a radical of the formula

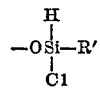

and addition products of the alkylene oxides corresponding to the oxyalkylene units of the formula —OCHRCHR—, wherein R is the same as above, and hydrocarbons which are free of aliphatic unsaturation and contain from 2 to 6 hydroxyl groups, such as glycerol, after conversion of the OH groups of these addition products into

groups.

Examples of hydrocarbon radicals represented by R''' are alkyl radicals or cycloalkyl radicals having from 1 to 6 carbon atoms, such as methyl, ethyl, n-propyl, isopropyl, n-butyl, isobutyl and cyclohexyl radicals; aryl or aralkyl or alkaryl radicals, having from 6 to 12 carbon atoms, such as the phenyl and benzyl radicals and tolyl and xylyl radicals. Where the radical R''' is a hydrocarbon radical interrupted by ether oxygen atoms, it is preferred that no more than 10 carbon atoms separate the radical from the hydrogen atoms. An example of such a radical R''' is a radical of the formula

—CH(CH₂OCH₃)₂

Acyl radicals represented by R''', preferably having from 2 to 12 carbon atoms are monoacyl radicals such as acetyl, propionyl, butyryl, hexoyl, 2-ethylhexoyl, octanoyl, valeryl and the like. The value of x is from 4 to 50 and more preferably from about 10 to 25.

The polyoxyalkylene compounds used in this invention can be prepared by several convenient methods. For example, methyldichlorosilane may be reacted with polyoxyalkylene compounds of the general formula R'''(OCHRCHR)OH in equimolar amounts, wherein R and x are the same as defined above and R'''' is hydrogen or a monovalent hydrocarbon radical which is free from aliphatic unsaturation. In addition R'''' may be a hydrocarbon radical which is interrupted by ether oxygen atoms, or an acyl radical. The reaction may take place at room temperature and at the pressure of the surrounding atmosphere, that is about 760 mm. Hg (absolute) and at a temperature up to about 100° C. Although the reaction may be conducted in the absence of a solvent, it is preferred that an organic solvent, such as described above, be used.

The reaction which takes place in the first stage of the process according to the invention can be represented by the equation

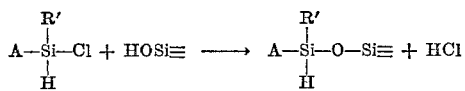

wherein R' is the same as above and A denotes the grouping —(OCHRCHR)ₓO—. In carrying out this reaction, ratios and reaction conditions known for the reaction ≡SiCl+HOSi≡→≡Si—O—Si≡+HCl, may be used. The reaction may be conducted in the presence or absence of organic solvents. In addition, acid-binding agents, can be employed, provided the silicon-bonded hydrogen does not split off during the reaction. In accordance with this method, the reaction can be illustrated above by the above equation. Although the reaction can be carried out at room temperature, the mixture can also be heated to an elevated temperature, if desired, to accelerate or complete the reaction and/or to remove the hydrogen chloride liberated. Appropriately, the pressure of the surrounding atmosphere, that is to say 760 mm. Hg (absolute) of approximately 760 mm. Hg (absolute) is employed during the reaction; however, if desired, higher or lower pressures can also be used. Examples of suitable acid-binding agents which may be employed are organic amines, such as aniline, toluidine, methylaniline, dimethylaniline, phenylenediamine, diphenylamine, triphenylamine, tributylamine, di-n-hexylamine, cyclohexylamine, pyridine and alpha-picoline. If an acid-binding agent is used, it should be employed in a slight molar excess over that required to bond all the hydrogen chloride produced during the reaction. Appropriately, one mol of the polyoxyalkylene compound used according to the invention is employed per gram equivalent of silicon-bonded hydroxyl groups in the organopolysiloxanes containing such groups.

The reaction product thus formed in the first stage is then reacted with a polysiloxane containing silicon-bonded hydroxyl groups in a second stage as illustrated by the general equation

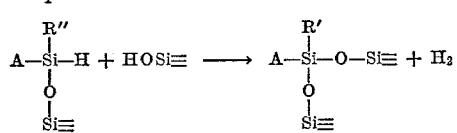

wherein R' and A have the same meaning as above. In this reaction, ratios and reaction conditions used in the conventional reaction of ≡SiH+HOSi≡→≡Si—O—Si≡+H₂ can be employed, for example, the use of organic solvents and catalysts at temperatures and pressures, known to promote the reaction of silicon-bonded hydrogen with silicon-bonded hydroxyl groups. The reaction in the second stage, as illustrated by the above equation, can thus be carried out at room temperature, or if desired, the mixture may be heated to an elevated temperature to accelerate the reaction. Appropriately, ambient pressure is employed during this reaction; however, if desired, higher or lower pressures can also be used. Examples of catalysts known to promote the reaction between a silicon-bonded hydrogen group and a silicon-bonded hydroxyl group are alkali metal hydroxides and alkaline earth hydroxides, ammonia and amino compounds having a basic dissociation constant, in dilute aqueous solution at 25° C. of at least 10⁻⁷, including, substituted, hydroxylamine, colloidal nickel, ansolvo-acids, such as zinc chloride and magnesium chloride, alkali metal alcoholates, chloroplatinic acid, metal and organometallic salts of carboxylic acids, such as dibutyltin dilaurate. Alkali metal hydroxides, such as potassium hydroxide is the preferred catalyst for the second stage, since it is readily available and is easily separated from the reaction products. Since rearrangement of siloxane bonds to form cyclic organopolysiloxanes, is to be avoided, the alkali metal hydroxide must be used in such amounts that a mixture of water and the reaction mixture of the second stage has a pH value of from 7.0 to 7.5.

Surprisingly, the organopolysiloxane-polyoxyalkylene block copolymers prepared according to the invention are suitable as foam stabilizers for the preparation of foams, especially polyurethane foams. Examples of other uses of the block copolymers of this invention are as de-emulsifiers for polymer emulsions, as levelling agents for paints, for rendering hydrophobic fibers antistatic, as a constituent of cosmetics, for example hairdressing aids and agents for skin care, as fire extinguishing agents, as textile reviving agents, as cleaning agents for window screen washing equipment, as filament slip agents, as emulsifiers, for example, for aqueous dispersions of organopolysiloxanes, especially wax-like organopolysiloxanes, hydrocarbons, pesticides or herbicides, and as rubber lubricants in the manufacture of automobile tires.

In the illustrative examples which follow, the reactions are all carried out at room temperature and at about 760 mm. Hg (absolute), unless otherwise stated. All parts are by weight unless otherwise specified.

EXAMPLE 1

About 370 parts of an addition product of ethylene oxide and methanol, having an average molecular weight of 700, are added dropwise, with agitation, to a solution containing 67 parts of methyldichlorosilane in about 200 parts by volume of toluene. After stirring for about one hour, a solution containing about 200 parts of a dimethylpolysiloxane containing one silicon-bonded hydroxyl group on each of the terminal groups ($m$=an average of 0.2; $y$=9) in about 400 parts by volume of toluene is added to the reaction product thus obtained, and the mixture is agitated for an additional hour. It is then warmed for two hours under toluene reflux in order to complete the reaction and to remove the hydrogen chloride liberated.

Sufficient powdered potassium hydroxide is added to the reaction mixture thus obtained so that a mixture of water and a sample of the reaction mixture has a pH value of 7.5. During the course of the addition, the reaction mixture foams vigorously. The reaction is complete after stirring for about one hour.

Finally, the reaction mixture thus obtained is neutralized with ammonium chloride at about 100° C., filtered and the solvent distilled off from the filtrate at about 12 mm. Hg (absolute).

A colourless, clear oil having a viscosity of 100 cs./25° C. is obtained.

EXAMPLE 2

A solution containing about 15 parts of methyldichlorosilane in about 400 parts by volume of xylene is added dropwise, with agitation, to about 210 parts of a polyoxyalkylene compound of the formula n-C₄H₉(OC₂H₄)₁₅(OC₃H₆)₁₅OH which is prepared from ethylene oxide, propylene oxide and butanol and having an average molecular weight of 1600. After stirring for about one hour, a solution containing about 70 parts of a mixed hydrolysis product obtained from 4 mols of methyltrichlorosilane, 3 mols of dimethyldichlorosilane and 2 mols of trimethylchlorosilane in about 200 parts by volume of xylene, and a solution containing about 23.7 parts of pyridine in about 300 parts by volume of xylene, are simultaneously added to the reaction product thus obtained. The mixture immediately turns cloudy as a result of the formation of the pyridinium hydrochloride precipitate.

After stirring for one hour, the precipitate is removed by filtration and the filtrate is treated with about 0.2 part of powdered potassium hydroxide, with vigorous agitation, so that a mixture of water and a sample of the reaction mixture has a pH value of about 7.5. During the addition of the powdered potassium hydroxide, the mixture foams vigorously. The reaction is complete after about 2 hours agitation.

The reaction mixture thus obtained is neutralized with ammonium chloride at about 100° C., filtered and the solvent distilled off from the filtrate at about 12 mm. Hg (absolute).

A clear, yellowish oil having a viscosity of about 1300 cs./25° C. is obtained.

EXAMPLE 3

About 210 parts of a polyoxyalkylene compound prepared from ethylene oxide and propylene oxide in the molar ratio of 1:1 and glycerine, having an average molecular weight of 2200, are added dropwise, with agitation, to a solution containing about 32.6 parts of methyldichlorosilane in about 400 parts by volume of benzene. After stirring for about one hour, a solution containing about 70 parts of the dimethylpolysiloxane described in Example 1 in about 100 parts by volume of benzene is added to the reaction product thus formed and the reaction mixture stirred for an additional hour and then refluxed for 2 hours.

Sufficient powdered potassium hydroxide is added to the reaction mixture thus obtained so that a mixture of water and a sample of the reaction mixture has a pH value of 7.5. During the addition of the potassium hydroxide, the mixture foams vigorously. After stirring for about one hour, the reaction is complete.

The reaction mixture thus obtained is neutralized with ammonium chloride at 100° C., and the solvent distilled off from the filtrate at about 12 mm. Hg (absolute).

A clear, yellowish oil having a viscosity of about 1700 cs./25° C. is obtained.

Although the present invention has been defined specifically with reference to the above examples, it should be understood that these examples are given only for purposes of illustration. Other variations which will become apparent to those skilled in the art are intended to be included within the scope of this invention.

What is claimed is:

1. A method for preparing organopolysiloxane-polyoxyalkylene block copolymers which comprises reacting in a first stage an organopolysiloxane containing silicon-bonded hydroxyl groups with a polyoxyalkylene compound having at least one group of the general formula

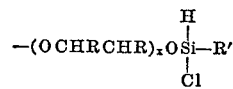

wherein each R, is selected from the group consisting of hydrogen and alkyl groups and R′ represents a hydrocarbon group having from 1 to 6 carbon atoms and $x$ represents a number of from 4 to 50, and thereafter reacting in a second stage the silicon-bonded hydrogen atoms of the reaction product with unreacted silicon-bonded hydroxyl groups from the first stage.

2. The method of claim 1, wherein the organopolysiloxane has the general formula

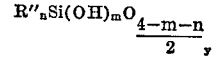

wherein R″ is selected from the class consisting of monovalent hydrocarbon radicals and halogenated monovalent hydrocarbon radicals having from 1 to 6 carbon atoms, $n$ and $m$ each represent a number of from 0 to 3, the sum of m and n being not greater than 3, with the average value of m being 0.005 to 4 and the average value of n being 0.8 to 2.2, and y is a number of from 5 to 3,000.

3. The method of claim 2, wherein the average value of m is 0.1 to 0.3.

4. The method of claim 2, wherein R″ is a hydrocarbon radical.

5. The method of claim 2, wherein R″ is a halogenated hydrocarbon radical.

6. The method of claim 2, wherein at least 90% of the R″ radicals are methyl radicals.

7. The method of claim 2, wherein the organopolysiloxane is obtained from the hydrolysis of chlorosilanes of the general formula $R''_nSiCl_{4-n}$, wherein R″ is selected from the class consisting of monovalent hydrocarbon radicals and halogenated monovalent hydrocarbon radicals and n in a number of from 1 to 3, in an inert solvent and the solution thus obtained is reacted with the polyoxyalkylene compound.

8. The method of claim 7, wherein the inert solvent is selected from the class consisting of a hydrocarbon which is liquid at room temperature and 760 mm. Hg (absolute), an ether and a ketone.

9. The method of claim 1, wherein the polyoxyalkylene compound is a compound of the general formula

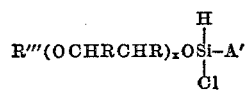

wherein each R is selected from the group consisting of hydrogen and alkyl groups, R′ represents a hydrocarbon group having from 1 to 6 carbon atoms, R‴ is selected from the class consisting of monovalent hydrocarbon radicals free from aliphatic unsaturation, monovalent hydrocarbon radicals interrupted by ether oxygen atoms, an acyl radical and a radial of the formula

in which R′ is the same as above and x represents a number of from 4 to 50.

10. The method of claim 9, wherein R‴ is a hydrocarbon radical containing from 1 to 12 carbon atoms.

11. The method of claim 9, wherein R‴ is a monovalent hydrocarbon radical interrupted by ether oxygen atoms and is not more than 10 atoms from the hydrogen atoms.

12. The method of claim 9, wherein R‴ is an acyl radical having from 2 to 12 carbon atoms.

13. The method of claim 12, wherein R‴ is an acetyl radical.

14. The method of claim 9, wherein x is a number of from 10 to 25.

15. The method of claim 1, wherein the polyoxyalkylene compound is an addition product of an alkylene oxide having an oxyalkylene unit of the formula OCHRCHR, wherein R is selected from the group consisting of hydrogen and alkyl groups, and a hydrocarbon free of aliphatic unsaturation and containing from 2 to 6 hydroxyl groups, said hydroxyl groups of said product having been converted into groups of the formula

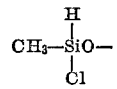

16. The method of claim 1, wherein the polyoxyalkylene compound is prepared from the reaction of methyldichlorosilane with a polyoxyalkylene compound containing hydroxyl groups in an inert solvent.

17. The method of claim 16, wherein the inert solvent is selected from the class consisting of a hydrocarbon which is liquid at room temperature and 760 mm. Hg (absolute) an ether and a ketone.

18. The method of claim 1, wherein the first stage of the reaction is carried out in the presence of an acid-binding agent.

19. The method of claim 1, wherein one mol of polyoxyalkylene compound is used per gram equivalent of silicon-bonded hydroxyl group on the organopolysiloxane in the first stage of the reaction.

20. The method of claim 1, wherein the reaction in the second stage is carried out in the presence of a catalyst which promotes the reaction of silicon-bonded hydrogen atoms with silicon-bonded hydroxyl groups.

21. The method of claim 20, wherein the catalyst is an alkali metal hydroxide.

22. The method of claim 21, wherein the catalyst is potassium hydroxide.

23. The method of claim 21, wherein the alkali metal hydroxide is used in such an amount that a mixture of water and the reaction mixture has a pH value of from 7.0 to 7.5.

References Cited

UNITED STATES PATENTS

| | | | |
|---|---|---|---|
| 3,272,762 | 9/1966 | Ibbotson et al. | 260—448.8 R X |
| 3,170,894 | 2/1965 | Brown et al. | 260—448.8 R X |
| 2,917,480 | 12/1959 | Bailey et al. | 260—448.8 R X |
| 2,834,748 | 5/1958 | Bailey et al. | 260—448.8 R X |
| 3,629,310 | 12/1971 | Bailey et al. | 260—448.8 R |
| 3,600,418 | 8/1971 | Bailey et al. | 260—448.8 R |
| 3,526,651 | 9/1970 | Rossmy et al. | 260—448.8 R |

DANIEL E. WYMAN, Primary Examiner

P. F. SHAVER, Assistant Examiner

U.S. Cl. X.R.

260—46.5 R